March 2, 1943.  I. O. MINER  2,312,926
INSTRUMENT MOUNTING
Filed Nov. 1, 1940  2 Sheets-Sheet 1

IRVING O. MINER
INVENTOR.

BY
ATTORNEY

March 2, 1943.　　　　I. O. MINER　　　　2,312,926
INSTRUMENT MOUNTING
Filed Nov. 1, 1940　　　　2 Sheets-Sheet 2

IRVING O. MINER
INVENTOR.

BY
ATTORNEY

Patented Mar. 2, 1943

2,312,926

UNITED STATES PATENT OFFICE 2,312,926

INSTRUMENT MOUNTING

Irving O. Miner, Rumford, R. I., assignor to Builders Iron Foundry, Providence, R. I., a corporation of Rhode Island Application November 1, 1940, Serial No. 363,852

2 Claims. (Cl. 73—151)

This invention relates to improvements in instrument mountings. More especially it has to do with the mounting of a dial plate so that it may be swung from its normally closed position to an open position affording convenient access to the mechanism mounted on the rear side of the plate.

Instruments are customarily placed on a wall at a sufficient elevation for their dial to be visible from a distance. The operating mechanism for the pointer is usually attached to the rear side of the dial plate and connected with a conduit frequently concealed in the wall. When adjustment or inspection of the instrument becomes necessary it is desirable that the dial plate be simply swung away from the wall without separating the mechanism from the conduit but bringing it to a position where it can be worked upon. Heretofore a hinge has frequently been provided at one side of the instrument; but this is objectionable in appearance since it destroys the desired circular configuration throughout the entire periphery of the instrument. Such a hinge is further objectionable in that it does not provide a stable position of the dial plate when its mechanism requires adjustment unless the plate is swung far enough to bring its front against the wall, in which event there is great danger of its glass face being cracked or destroyed.

It is an object of the present invention to provide a mounting for a dial plate which is normally entirely concealed, but which readily permits the dial plate to be swung outward into a position where the operating mechanism is fully accessible. This improved mounting prevents contact of the glass face with the wall and holds the dial plate in a desirably stable position while work on its associated mechanism is being performed.

The best mode in which I have contemplated applying the principles of my invention is shown in the accompanying drawings, but these are to be taken as merely illustrative because it is intended that the patent shall cover by suitable expression in the appended claims whatever features of patentable novelty exist in the invention as a whole.

Figure 3:
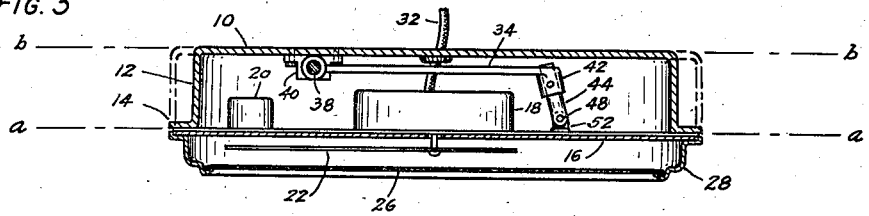
Figure 3 is a plan in section as on line 3—3 of Figure 1, with dot-and-dash lines suggesting a slight modification.

Referring more particularly to the drawings, the instrument comprises a casing having a back wall 10 and a cylindrical side wall 12 terminating in an external annular flange 14 if the instrument is to be mounted flush with the surface of a wall (indicated by the dotted line a—a in Figure 3). The wall in such an arrangement would be properly recessed to receive the body of the casing with a shallow marginal recess for the flange. If the instrument is to be mounted so as to stand entirely outward from the wall surface, (indicated by the line b—b in Figure 3) the casing would then preferably be made as represented by the dot-and-dash outline with the flange 14 as an internal one rather than an external one as shown in full lines. The front of the casing is an opening which is normally closed by a dial plate 16.

This dial plate has mounted on its rear side various mechanisms, represented by the rectangles 18 and 20, for actuating the customary indicating pointer 22 which sweeps the dial 24 on the front side of the plate and is visible through a glass face 26 secured to the dial plate by the usual bezel 28. Normally the dial plate rests against the flange 14, being held thereto by clamping screws 30 which extend through the bezel. All of the associated mechanism is housed within the casing into which leads a conduit 32 for transmitting the actuating medium.

Figure 1:
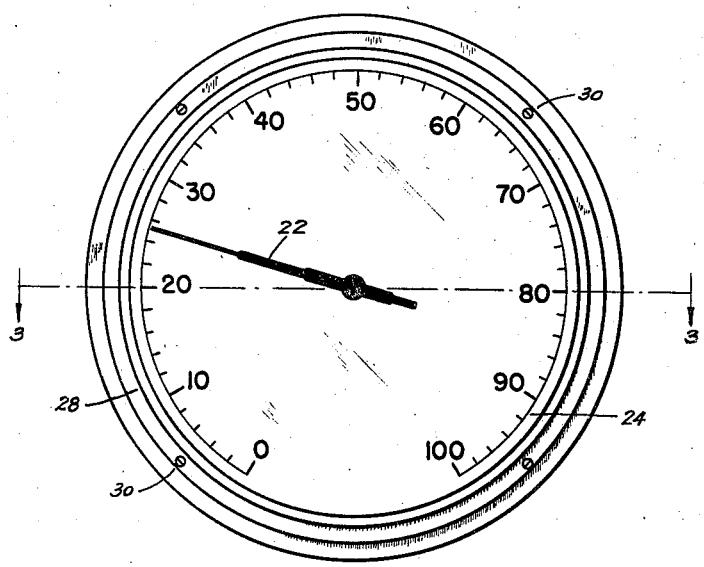
Figure 1 is a front view of an instrument embodying my improved mounting.
Figure 2:
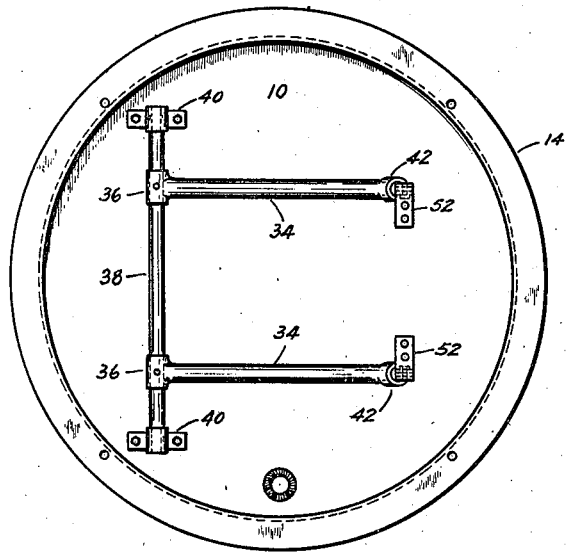
Figure 2 is a front view of the casing and mounting means, the dial plate and its associated elements being removed.
Figure 4:
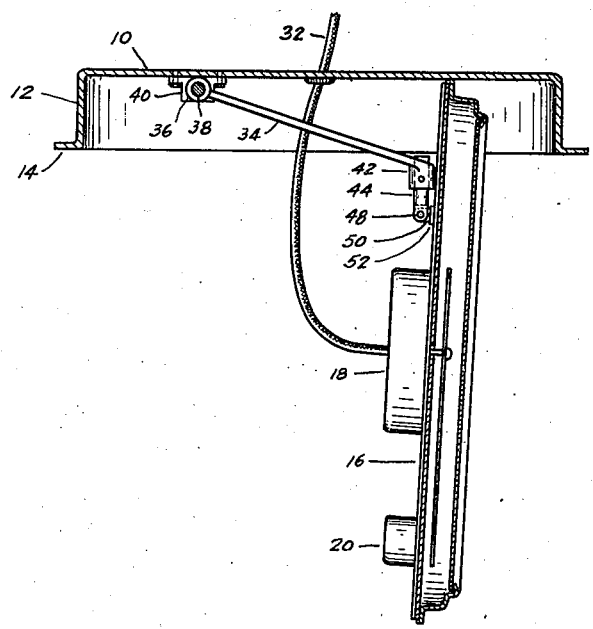
Figure 4 is also a plan in section like Figure 3 but showing the dial plate in a predetermined open position.
Figure 5:
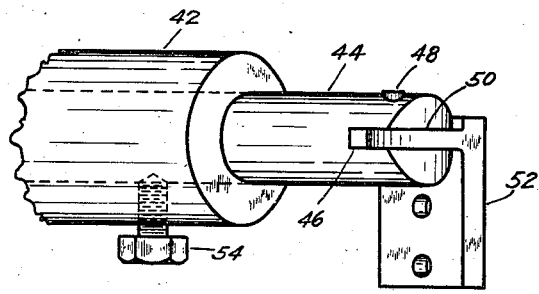
Figure 5 is a perspective of a detail.

For pivotally supporting the dial plate for swinging movement from its closed position shown in Figure 3 into the open position illustrated in Figure 4, so that the various mechanisms normally housed inside of the casing will be readily accessible for inspection or adjustment, the invention provides a mounting comprising two separated arms 34 vertically disposed one above the other, (see Figure 2) and having hubs 36 at one end adjustably secured to a vertical shaft 38 journaled in brackets 40 secured to the back wall 10 of the casing. At its other end each arm 34 has a sleeve-like boss 42 which is obliquely disposed with respect to the body of the arm and extends outwardly toward the circular front opening of the casing. Slidable in the boss 42 is a rod 44 (see Figure 5) slotted at its outer end, as at 46, to receive and be pivotally connected by a pin 48 to a bearing arm 50 of a bracket 52. These brackets are secured to the rear side of the dial plate 16 with the axes of the pivot pins 48 in vertical alignment. The rod 44 when properly adjusted within the boss 42 is secured thereto by a set screw 54.

When the dial plate is in its normally closed position shown in Figure 3, the arms 34 lie close to and substantially parallel with the back wall 10 of the casing, the bosses 42 and rods 44 extending outward at an obtuse angle thereto to join the dial plate. If it becomes necessary to open the latter its clamping screws 30 are disengaged from the casing and then the dial plate is swung simultaneously about the axis of the shaft 38 and the pivot pins 48. If work is to be done on the mechanism, the dial plate is preferably turned about the pivot pins 48 until its rear side brings up against the bosses 42 and the whole is swung about the axis of shaft 38 until the edge of the plate rests against the back wall 10 of the casing. In this position the plate is held relatively stable with all the mechanism fully available. The conduit 32 will be sufficiently long to accommodate the swing of the plate and thus remain connected so that the operation of the instrument can be tested while the dial plate is in open position.

Although an electrically operated indicating instrument is shown and described, the novel features of the invention are applicable to other display instruments such as recorders and integrators and to combination instruments such as an indicator-recorder-integrator, and to instruments operated by outside power other than electricity and to instruments such as clocks in which the power is self-contained.

I claim:

1. An instrument mounting comprising, in combination, a casing adapted to be mounted vertically and having a front opening; a dial plate removably seated on the casing to close said opening; and hinge means within the interior of said casing connecting the dial plate thereto and comprising vertically-spaced separated arms pivotally connected at one end to the casing and movable about a common vertical axis in a horizontal direction, the other end of each said arm having an obliquely inclined portion carrying an adjustable element to which is pivoted a bracket secured to the back of said dial plate, the pivot axes of said brackets being in vertical alignment.

2. An instrument mounting comprising, in combination, a casing adapted to be mounted vertically and having a front opening; a dial plate removably seated on the casing to close said opening; and hinge means within the interior of said casing connecting the dial plate thereto; the said hinge means comprising a vertical shaft secured to the back wall of the casing, a pair of vertically spaced horizontally-extending arms pivotally mounted at one end on said shaft with the other end of each of said arms formed as an integral hollow boss obliquely inclined with respect to the longitudinal axis of the arm, a rod adjustably held in each of said bosses, a bracket pivotally connected to said rod and secured to the back of said dial plate, the pivots for said brackets being in vertical alignment.

IRVING O. MINER.